United States Patent [19]

Murphy

[11] Patent Number: 4,700,741

[45] Date of Patent: Oct. 20, 1987

[54] BALL CHECK VALVE

[75] Inventor: Edward P. Murphy, Coon Rapids, Minn.

[73] Assignee: Graco Inc., Minneapolis, Minn.

[21] Appl. No.: 905,242

[22] Filed: Sep. 8, 1986

[51] Int. Cl.[4] .............................................. F16K 15/04
[52] U.S. Cl. .............................. 137/543.19; 137/539; 251/337
[58] Field of Search .......................... 137/539, 543.19; 251/337

[56] References Cited

U.S. PATENT DOCUMENTS

| | | | |
|---|---|---|---|
| 619,705 | 2/1899 | Knupp | 137/539 X |
| 2,707,965 | 5/1955 | Allen | 137/75 |
| 2,935,082 | 5/1960 | Richardson et al. | 137/543.19 X |
| 2,950,736 | 8/1960 | Oldberg | 137/529 |
| 3,002,528 | 1/1961 | Leissner | 137/539 |
| 3,219,057 | 11/1965 | Knowles | 137/539 |
| 3,288,167 | 11/1966 | Gibson | 251/337 |
| 3,358,770 | 12/1967 | Zandmer | 166/224 |
| 3,378,030 | 4/1968 | Cary | 137/516.29 |
| 3,421,547 | 1/1969 | Aslan | 137/539 |
| 3,524,469 | 8/1970 | Jebe | 137/543.19 |
| 3,626,977 | 12/1971 | Riley | 137/516.25 |
| 3,720,220 | 3/1973 | McMath | |
| 3,913,615 | 10/1975 | Cooper | 137/543.19 |
| 4,091,839 | 5/1978 | Donner | 137/533.13 |

Primary Examiner—Alan Cohan
Assistant Examiner—John Rivell
Attorney, Agent, or Firm—Douglas B. Farrow

[57] ABSTRACT

A ball check valve is provided having a ball retainer which is particularly inexpensive to manufacture and yet which is capable of allowing high amounts of flow without clogging or plugging. The retainer member is formed with three stamped pieces of sheet material which are generally u-shaped and have included an angle such that the sum of the angles is 360°. In the preferred embodiment three such retainer components are used and the retaining member is held in place between two housing members which are threadably attached to one another. The ball and spring are held in place by the retainer member.

5 Claims, 3 Drawing Figures

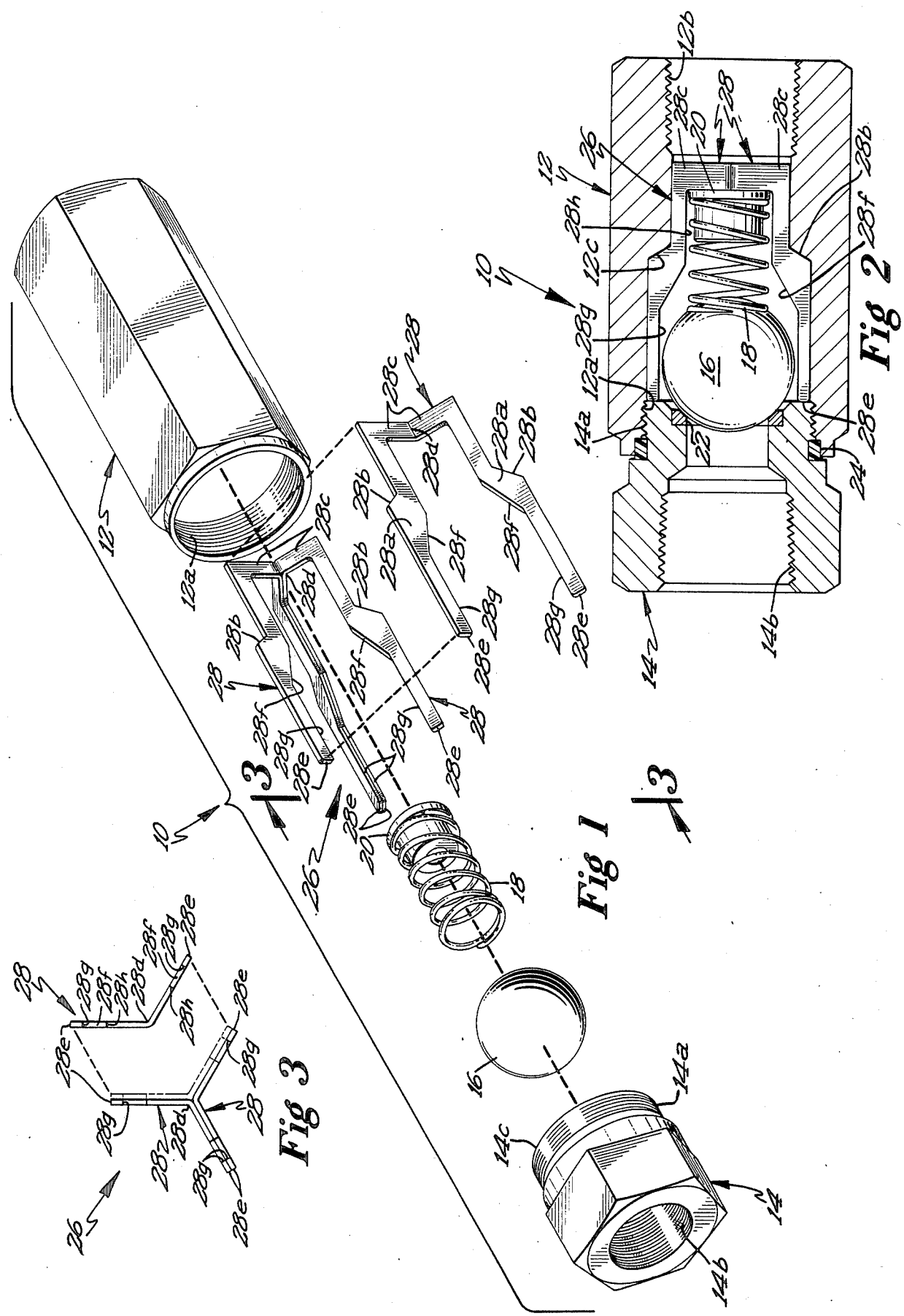

BALL CHECK VALVE

BACKGROUND OF THE INVENTION

In general, ball check valves are used in a variety of applications. While in some applications the design of such valves is not particularly critical, it is of course always desired to provide a check valve construction which is inexpensive to manufacture, operates effectively and is easy to assemble and disassemble. In particular, when pumping highly viscous materials which may have fibers therein, it is important to provide a ball check valve which allows material to flow through the valve without clogging or plugging and which provides no dead spots which encourage such results.

In one prior art design manufactured by Deltrol, a one piece metallic housing has a cruciform molded plastic insert threaded therein. The insert has a generally u-shaped cross section (with the cross section is taken across the diameter). The u-shape retains the spring and ball therein. Such prior art valves while generally effective, do provide an unduly restricted flow and are subject to clogging. Additionally, the threads on the insert may tend to strip and such parts are relatively expensive to manufacture.

It is therefore an object to the instrument of invention to provide ball check valve which is inexpensive to manufacture and easy to assemble. It is further an object of this invention to provide ball check valve which flows material without clogging or plugging and which minimizes the dead spots therein.

SUMMARY OF THE INVENTION

The housing of the instant invention is formed from first and second housing members. The housing members are threadably attached to one another and the second housing member has a ball seat therein for seating of the check ball. The first housing member has a passage there through having a first larger diameter adjacent to the second housing member and a necked down second diameter adjacent the outlet of the first housing member.

In the preferred embodiment, three retainer member components form a retainer member for locating and retaining the check ball and spring within the housing. Each retainer member is generally u-shaped in cross-section and has an included angle which is comprised of a fold in the base of the u-shape. In the preferred embodiment, the included angle is preferably approximately 120° such that when three of the retainer components are positioned next to each other, they form a three-pointed star in cross-section. Due to the thinness out of which these components may be made when they are stamped out of sheet metal, an absolute minimum of area is presented to the flow thereby minimizing the restriction to the flow.

The retainer member formed by the retainer components has a first diameter adjacent the second housing member which is slightly larger than the diameter of the ball and second inside diameter which is less than the diameter of the ball and is slightly greater than the diameter of the spring. Thus the ball and spring are positioned in the retainer member which is in turn located within the first housing member by a step down outer diameter which corresponds with the step-down second diameter of the first housing member. A spring retainer is positioned at the end of the spring opposite the ball and seats against the base of the retainer member.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is an exploded perspective view of the instant invention.

FIG. 2 is a cross sectional view taken along the axis of the instant invention.

FIG. 3 is a sectional view taken along line 3—3 of FIG. 1.

DESCRIPTION OF THE PREFERRED EMBODIMENT

The instant invention, generally designated 10, is comprised of first housing member 12 and a second housing member 14. First housing member 12 has a threaded section 12A, an outlet threaded section 12B and a decked down portion 12C. Similarly, second housing member 14 has a threaded portion 14A which threadedly engages portion 12A of first housing member 12. Second housing member 14 also has a threaded inlet passage 14B and an end 14C. A ball 16 is located within first housing member number 12 and is biased place by a spring 18. The spring retainer 20 is located within spring 18 and forces ball 16 against seat 22 located in second housing member 14. The seal 24 assures sealing between first and second housing members 12 and 14 respectively.

The ball guide retainer 26 is formed of three ball guide retainer components 28. Components 28 are shown in more detail individually in FIGS. 1 and 3. Each retainer component 28 is generally u-shaped and is comprised of two legs 28A joined by a base 28C having a fold 28D in the middle thereof. Fold 28A forms an included angle which in the preferred embodiment is approximately 120°, such that the total included angles of components is approximately 360° and forms the three-pointed star as shown in FIG. 3. Of course it can be recognized that if desired retainer 26 may be formed of more than three components 28. For example four or even five could be utilized.

Jog 28B on the outer edge of leg 28A matches with jog 12C on the first housing member 12 to fixedly locate ball guide retainer 26 within the first housing member 12. Similarly, end 28E is held in place by the bottom edge 14C of second housing member 14. An inner jog 28F separates the first inner diameter 28G which is sized to be slightly larger than the diameter of ball 16 and second inner diameter 28H which is sized to be smaller than the diameter of ball 16 yet slightly larger than the outer diameter of spring 18.

Thus for assembly, the three components 28 are formed into the tri-pointed star shape shown in FIG. 3 and inserted into first housing member 12 whereupon jog 28B seats on jog 12C. The spring 18 and spring retainer 20 are then inserted into retainer assembly 26 and ball 16 inserted on top. Then, second housing 12 is threadedly inserted into first housing member 12 and rotated until seal 24 is engaged. As can be seen in FIG. 3, the configuration of ball guide retainer 26 presents a minimum area to the flow of this allowing maximum of flow for the space utilized.

It is contemplated that various changes and modifications may be made to the ball check valve without departing from the spirit and scope of the invention as defined by the following claims.

What is claimed is:

1. A ball check valve having a linear flow axis and comprising:
   a first housing member;
   a second housing member releasably attached to said first housing member;
   a ball having a diameter;
   a seat in said first housing member for releasably receiving said ball;
   a spring having a diameter;
   a ball retainer in said first housing, said retainer comprising:
   a first inside diameter somewhat greater than said ball diameter for releasably receiving said ball;
   a second inside diameter less than said ball diameter and greater than said spring diameter, said retainer being formed of at least three substantially identical retainer components, each said component being generally u-shaped, formed from a generally planar piece of material and comprising a base, two leg portions and an included angle being formed by a fold in said base parallel to said leg portions and said flow axis, said included angle being such that the sum of the included angles of said components is about 360°, on of said leg portions of one of said components being in substantial planar contact with a leg portion of an adjacent said component.

2. The ball check valve of claim 1 wherein each said retainer component is stamped from a single piece of sheet metal.

3. The ball check valve of claim 1 wherein said ball retainer is slideably received in said first housing and held therein by said second housing.

4. The ball check valve of claim 3 wherein said first member comprises an inner bore having a jog therein for positively locating a corresponding jog on said ball retainer.

5. The ball check valve of claim 1 wherein said first housing member is threadably attached to said second housing member.

* * * * *